United States Patent [19]
Travostino

[11] Patent Number: 5,920,248
[45] Date of Patent: Jul. 6, 1999

[54] MULTIPOLAR MAGNETIC RING

[75] Inventor: Francis Travostino, Annecy la Vient, France

[73] Assignee: The Torrington Company, Torrington, Conn.

[21] Appl. No.: 09/178,623

[22] Filed: Oct. 26, 1998

[30] Foreign Application Priority Data

Dec. 2, 1997 [FR] France .................................. 97 15169

[51] Int. Cl.$^6$ ................................ H01F 7/02; G01B 7/30
[52] U.S. Cl. ...................... 335/302; 335/306; 324/207.25
[58] Field of Search .................................. 335/296–306; 310/49 R, 152–156; 324/207.25

[56] References Cited

U.S. PATENT DOCUMENTS 5,422,618  6/1995  Leupold .................................. 335/306

Primary Examiner—M. L. Gellner
Assistant Examiner—Raymond Barrera
Attorney, Agent, or Firm—John C. Bigler

[57] ABSTRACT

A multipolar magnetic ring that generates a sinusoidal magnetic field has a cylindrical shape and two magnetic poles, north (N) and south (S), which are imbricated one in the other in such a manner that their widths ($L_p$) are equal and constant. Two magnetic transitions between each of the two poles each follow a continuous curve that moves by one half pole width for each quarter of a turn of the magnetic ring, with the two curves being shifted by 180° so that the magnetic field has a single period per turn of the magnetic ring. The magnetic field is implemented either along two spirals ($s_1$ and $s_2$) on one of the flat faces, or along two helixes ($h_1$ and $h_2$) on its cylindrical side. The magnetic ring may be used in absolute-position sensors, notably in bearings.

7 Claims, 5 Drawing Sheets

0°  360°

MULTIPOLAR MAGNETIC RING

BACKGROUND OF THE INVENTION

This invention relates generally to a multipolar magnetic ring for generating a magnetic field with a sinusoidal form and whose period corresponds to one or more turns of the ring. More particularly, such a magnetic ring is to be associated with sensors of a magnetic type, notably absolute-position sensors used, for example, in sensor bearings.

Currently, multipolar magnetic rings are often used in applications of magnetic position sensors because of their simplicity of use and their low cost. Generally, the substrate of such multipolar magnetic rings consists of at least one magnetic phase, made of ferrite or rare earth metals, whose magnetic regions are oriented by magnetization so as to create north and south poles. This substrate may consist of two phases, one being magnetic as described above and the other being nonmagnetic, made of an elastomer, a polymer, or a heat-hardenable material, for example. This second configuration offers an excellent compromise between magnetic performance and manufacturing cost of the resulting magnetic ring.

The magnetization of a multipolar magnetic ring to obtain a succession of north and south poles can be carried out either pole by pole, using a magnetization head displaced over the magnetic substrate to be magnetized, or by creating all the poles simultaneously by means of a magnetizer with coiled wire. When the magnetic rings are associated with magnetic sensors of the probe type with a Hall effect device, or with magnetoresistance or variable reluctance devices, they generate sinusoidal electrical signals whose processing yields information on speed, direction of rotation, and relative position of the systems in which they are integrated.

FIG. 1a illustrates a circular magnetic ring with eight pairs of north and south poles, viewed axially, that, in association with a digital probe having a Hall effect device placed opposite the magnetic ring, delivers a periodic electric signal with a square form as represented in FIG. 1b. For a given number of pairs of north and south poles, a given type of magnetic material, a given magnetic ring geometry, a given magnetization technology, and a given pole width, the profile of the magnetic field, generated by the ring and sensed by the sensing element of an associated magnetic sensor, can be different.

FIGS. 2a through 2d represent examples of magnetic field profiles delivered by such magnetic rings, respectively, of a sinusoidal type corresponding to a sensor that is close to the ring, of a triangular type corresponding to a sensor that is at a greater distance from the ring, and of a truncated sinusoidal type. Only the first sinusoidal profile makes it possible to perform simple electronic interpolations to increase the resolution of the digital position sensors artificially. Consequently, these current multipolar magnetic rings only provide relative position information, not absolute position information, that is, completely unambiguous information on position as soon as voltage is applied, without an initialization step or a step searching for the reference position.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a multipolar magnetic ring comprising a cylindrical configuration with a height (h) and a width (l) between an internal diameter ($D_i$) and an external diameter ($D_e$), with a reading diameter ($D_l$) representing the positioning of one or more magnetic sensors for reading the magnetic field generated by the magnetic ring. Two magnetic poles north (N) and south (S) are imbricated one in the other such that their widths ($L_p$) are equal and constant, and two magnetic transitions between each of the two poles each follow a continuous curve that moves by one-half width of the respective pole for each quarter turn of the magnetic ring. The two curves of the magnetic transitions are shifted by 180° so that the magnetic ring has a single period corresponding to one turn of the magnetic ring.

The foregoing and other aspects will become apparent from the following detailed description of the invention when considered in conjunction with the accompanying drawing figures.

BRIEF DESCRIPTION OF THE DRAWING FIGURES

FIG. 1a illustrates a prior art circular magnetic ring, viewed axially, as previously described;

FIG. 1b. represents a periodic electric signal delivered by a digital probe in association with the prior art magnetic ring of FIG. 1a, as previously described;

DETAILED DESCRIPTION

Figure 1A:
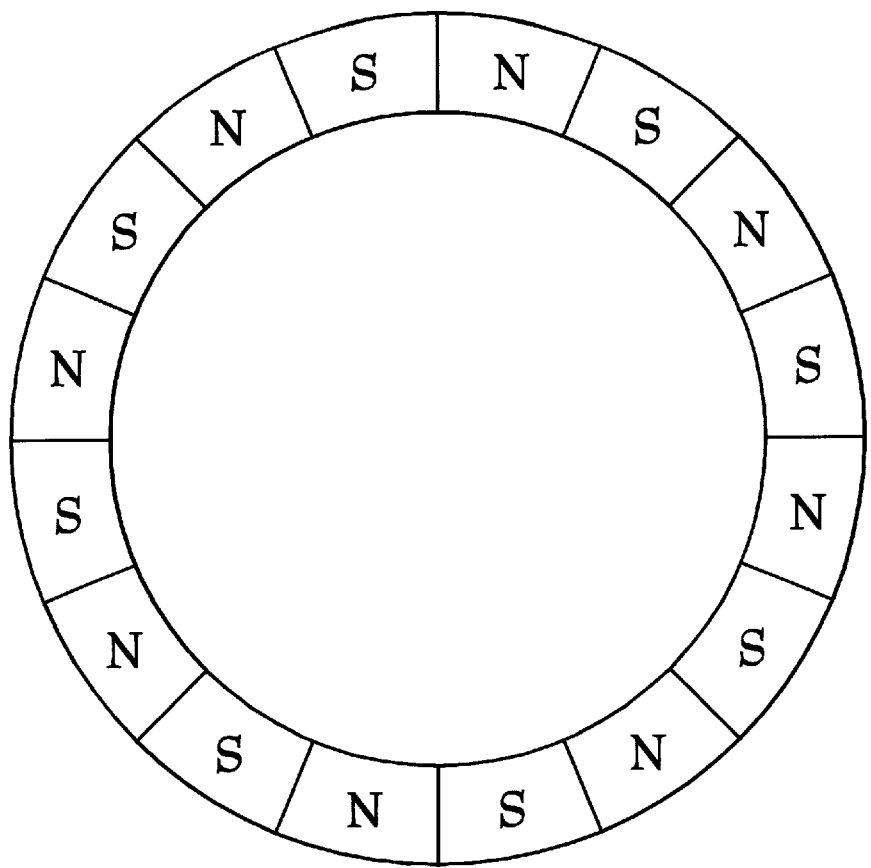
Figure 1B:
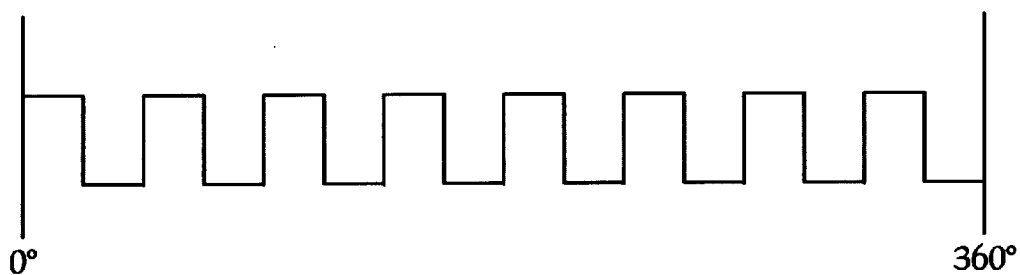
Figure 2A:
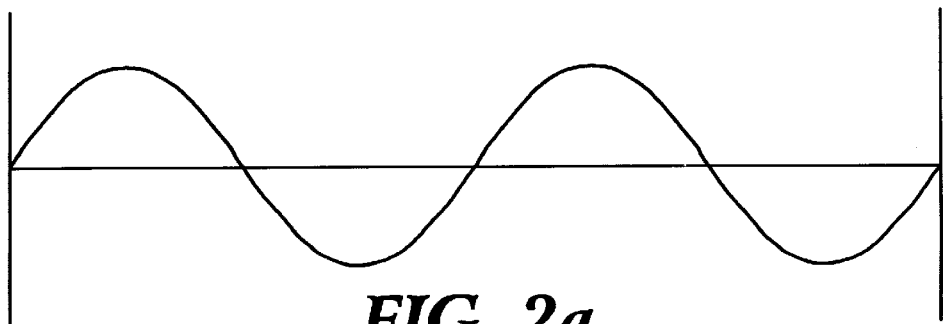
FIGS. 2a through 2d represent magnetic field profiles delivered by the prior art magnetic ring of FIG. 1a, as previously described.
Figure 2B:
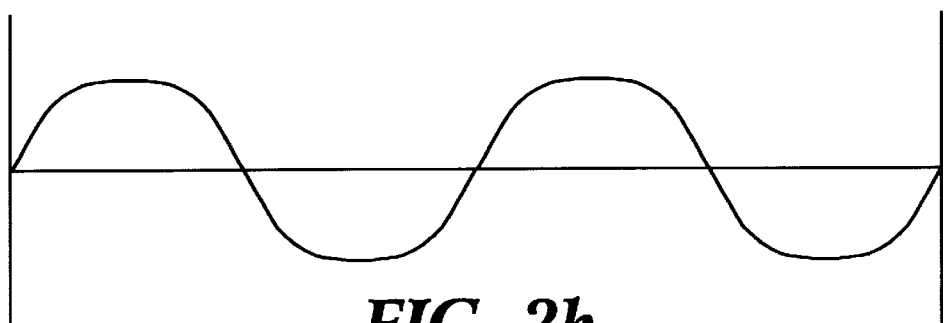
Figure 2C:
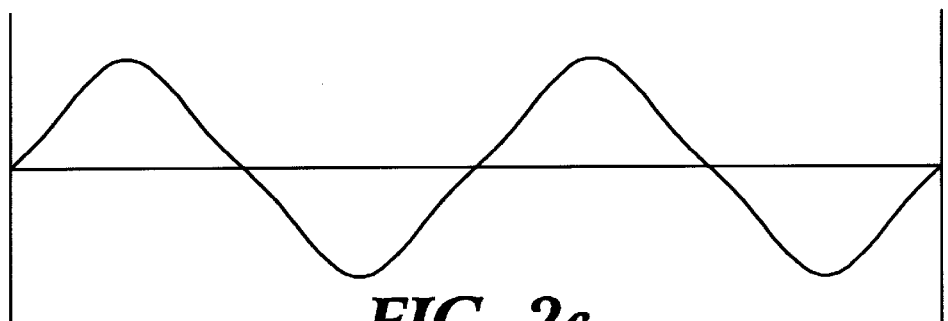
Figure 2D:
Figure 3:
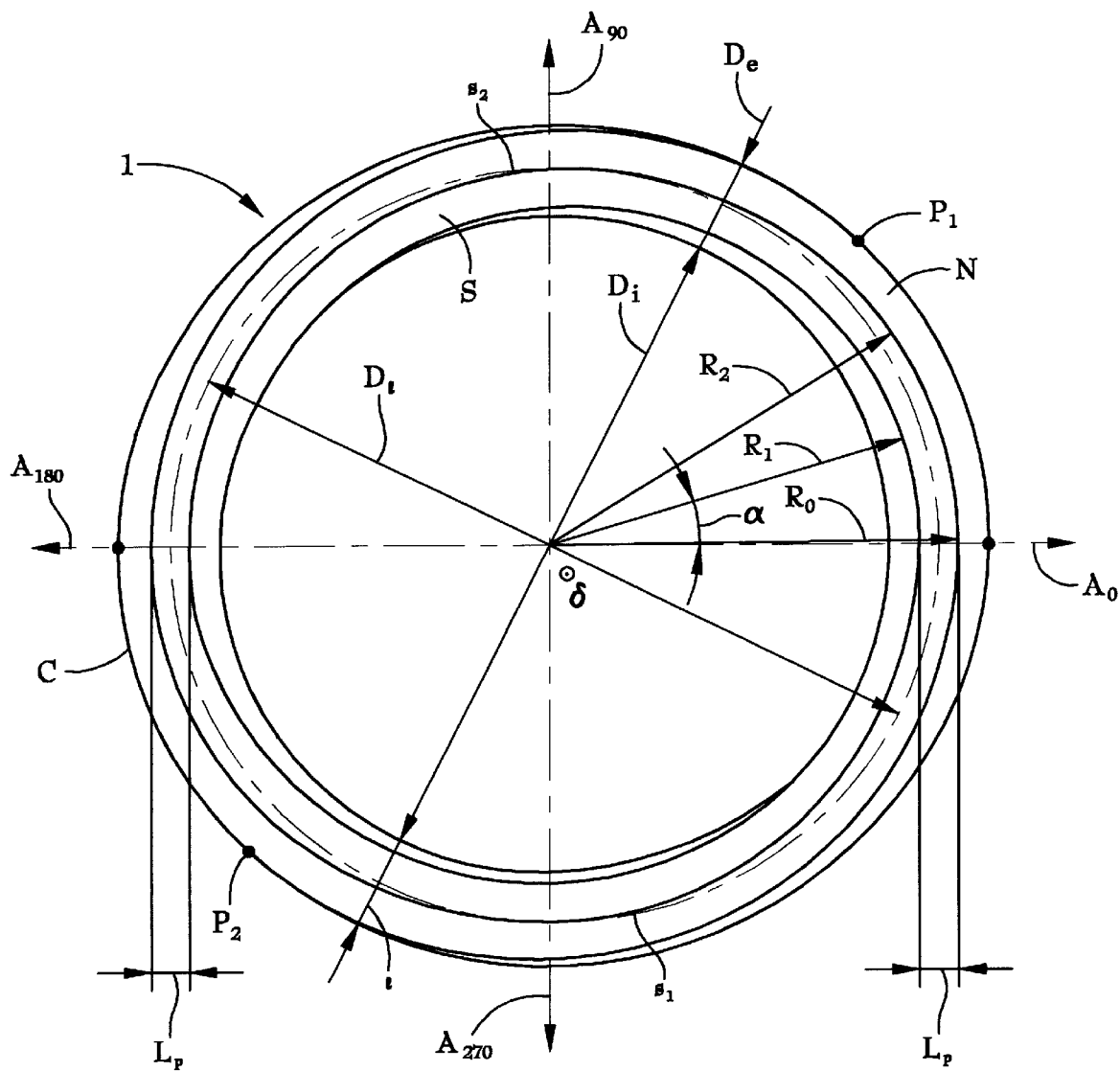
FIG. 3 is an axial view of a magnetic ring illustrating a first embodiment of the present invention.

Referring now to the drawings, a magnetic ring 1, made according to a first embodiment of the present invention and represented axially in FIG. 3, is cylindrical, with two parallel opposite faces. The faces have a radial width l and correspond to an internal diameter $D_i$ and an external diameter $D_e$, with a diameter $D_l$ called the reading diameter preferably located in the middle of this width. This diameter $D_l$ corresponds to the positioning diameter of the sensing element(s) of a magnetic sensor intended to read the magnetic field generated by the ring.

On one face of the magnetic ring 1, two poles are magnetized—a north pole N and a south pole S—imbricated one in the other along two spirals $s_1$ and $s_2$ that start at two points $P_1$ and $P_2$, which are diametrically opposite, on the circumference C of the magnetic ring. The spirals $s_1$ and $s_2$ have an equal length obtained by the rotation by at least one turn around the axis of symmetry δ of the magnetic ring, in such a manner that the width $L_p$ of each pole remains constant and identical for the two poles. In FIG. 3, the length of the two spirals is obtained by rotating by one turn and a quarter.

The evolution of the shape of the two poles, in the form of a spiral, is such that at the location of the reading diameter $D_l$, the two magnetic transitions in the form of a spiral, $s_1$ and $s_2$, between the north pole N and the south pole S, move in a continuous manner by one half pole width $L_p$ for each quarter turn of the ring, or 90 mechanical degrees. The equations that govern the variations in the radii $R_1$ and $R_2$ of the respective spirals $s_1$ and $s_2$ as a function of the mechanical angle a between the reference position 0° corresponding to a line $A_0$, and the other radius R of the ring, are as follows:

$$R_2 = R_0 - (L_p * \alpha / \pi)$$

$$R_1 = R_2 - L_p$$

$$R_0 = (D_I/2) + (L_p/2)$$

with $R_0 = R_2$ if $\alpha = 0°$ and α assuming all the real values between 0 and $2\pi$ radians.

Thus, for the position 0° corresponding to the line $A_0$, the south pole S is centered around the reading diameter $D_I$ on the one hand, and it is symmetrically framed by two identical parts of the north pole N, whose overall width is a function of the width 1 of the ring. For the position 90° corresponding to the axis $A_{90}$, the magnetic transition $s_2$ between the south pole S and the north pole N coincides with the reading diameter $D_I$ with the width of each pole being equal to $L_p$ on both sides of the transition $s_2$. As a function of the width 1 of the ring, two parts, with identical widths, of the north and south poles can frame the two widths $L_p$ of these poles.

For the position 180° corresponding to the axis $A_{180}$, the north pole N is centered around the reading diameter $D_I$ and in addition is symmetrically framed by two identical parts of the south pole S, that is, whose overall width is a function of the width 1 of the ring. Finally, for the position 270° corresponding to the axis $A_{270}$, the magnetic transition $s_1$ between the south poles S and the north pole N coincides with the reading diameter $D_I$. Each pole has a width equal to $L_p$ on both sides of the transition $P_1$.

Figure 4:
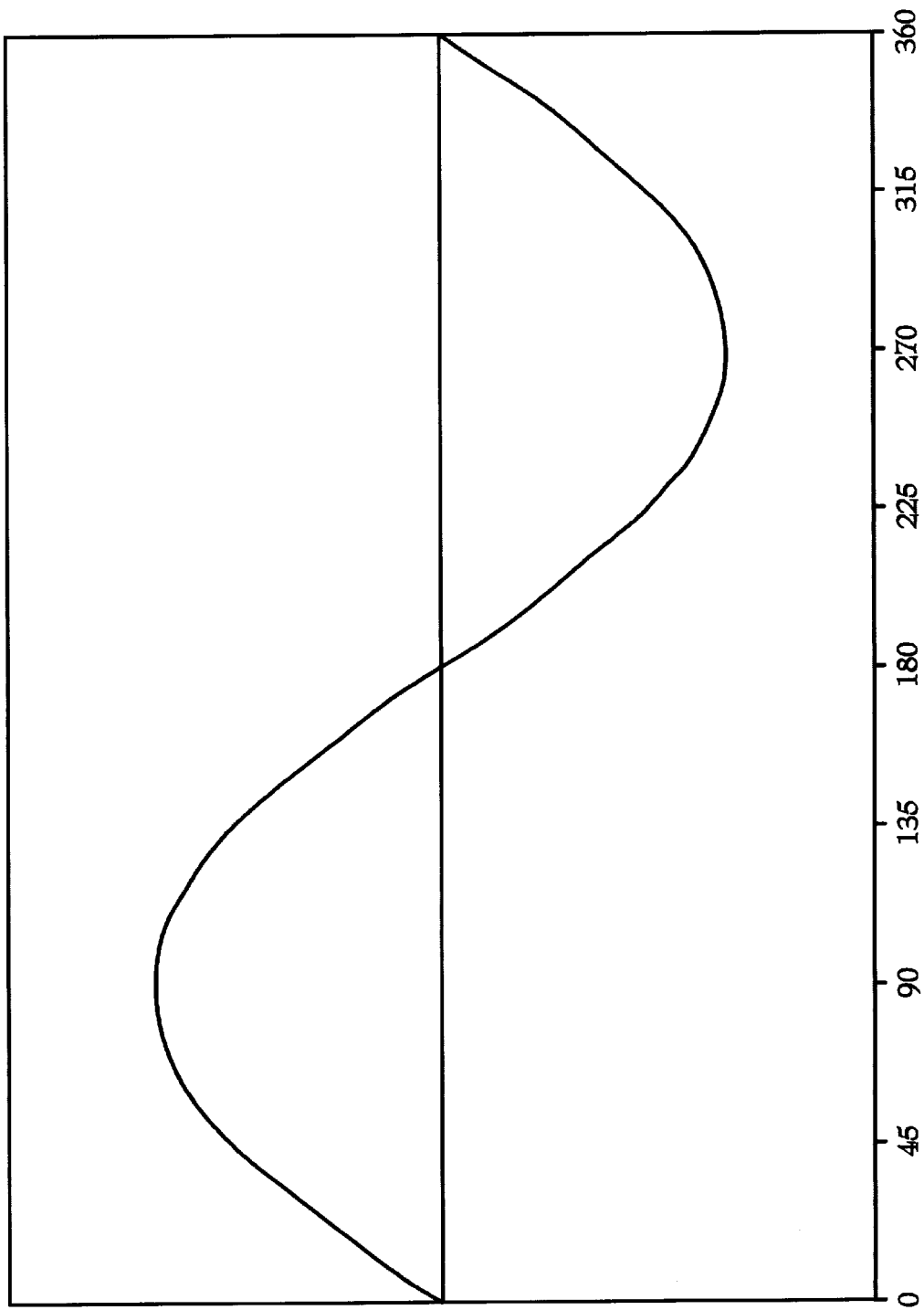
FIG. 4 represents the magnetic field profile delivered by a magnetic ring according to the present invention.

The cylindrical bipolar magnetic ring so described generates a magnetic field with a sinusoidal shape, which has only one period per turn of rotation of the ring around its axis of symmetry δ. The profile of this magnetic field is represented in FIG. 4. Unlike the prior art magnetic rings described above, the magnetic ring of the present invention can provide absolute position information without the need for an initialization step or a step searching for a reference position.

Figure 5A:
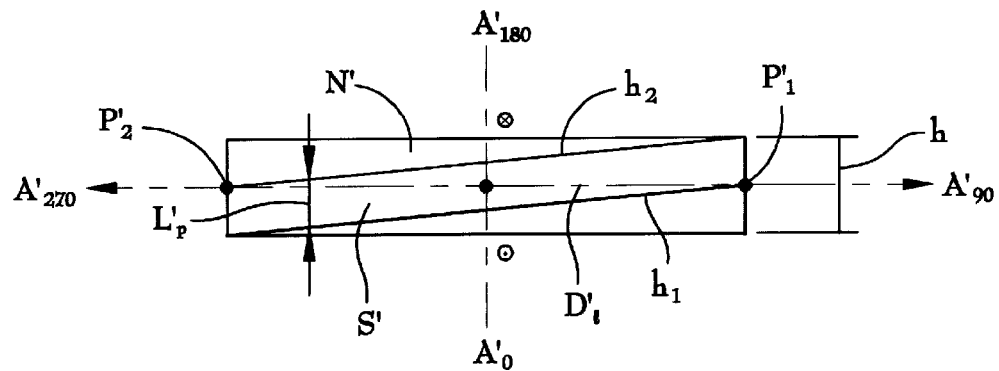
FIGS. 5a and 5b are two views, a radial view and an axial view, respectively, of a magnetic ring illustrating a second embodiment of the present invention.
Figure 5B:
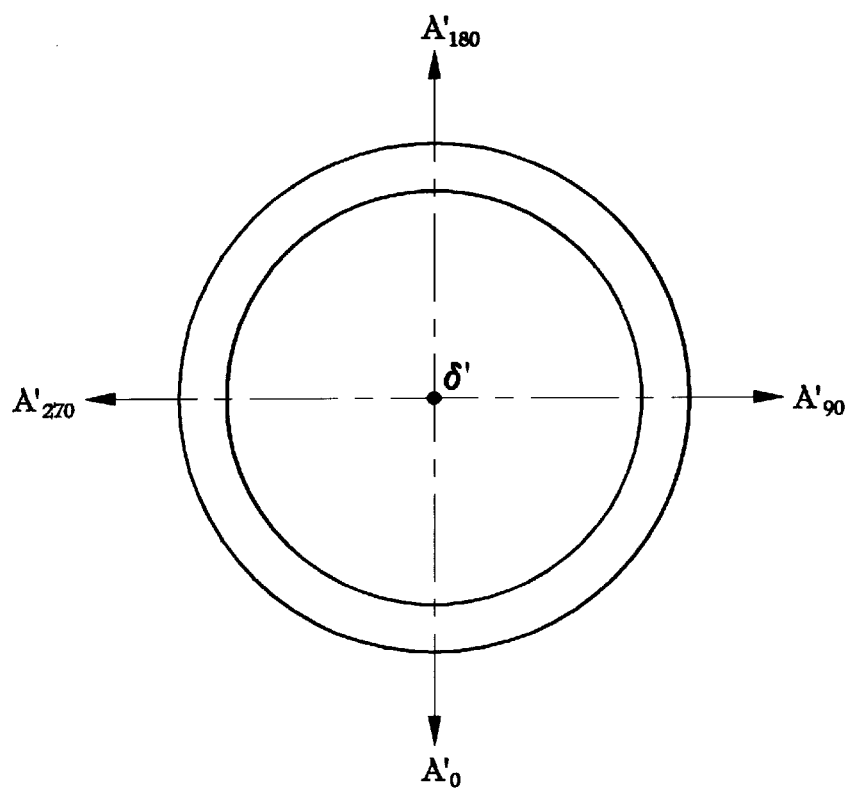

In a second embodiment of the magnetic ring according to the present invention, the external surface of a cylindrical ring with a height h is magnetized to obtain a north pole N' and a south pole S', as shown in FIG. 5a, which is a radial view of the magnetic ring along its height h, whereas FIG. 5b is an axial view along one of its two parallel end faces. The reading diameter $D'_I$ is located, preferably, in the middle of the height h. The two poles north N' and south S' have the same constant width $L'_p$, as a function of the height h of the ring. In FIG. 5a, the width $L'_p$ is equal to half the height h.

The two poles are imbricated one in the other along two helixes $h_1$ and $h_2$ centered about the axis of symmetry δ' of the ring, parallel and separated by a constant distance equal to $L'_p$, starting at two diametrically opposite points $P'_1$ and $P'_2$ on the reading diameter $D'_I$. At the location of the reading diameter $D'_I$, the magnetic field—at four orthogonal axes $A'_0$, $A'_{90}$, $A'_{180}$, and $A'_{270}$, corresponding to 0°, 90°, 180°, and 270°—passes through the maximum of the south pole S', a magnetic transition $h_1$, the maximum of the north pole N', and a magnetic transition $h_2$ between the two poles, respectively. The form of the two poles, in the shape of a helix, evolves continuously by one-half pole width $L'_p$ for each quarter turn of rotation of the ring, that is, for every 90 mechanical degrees.

A bipolar magnetic ring according to the present invention has the advantage that it can be used in sensor bearings for automobile applications, such as in the navigation and control of the travel path through the intermediary of steering-wheel column bearings. Another interesting use of such a magnetic ring concerns industrial applications wherein it is useful to be able to control and pilot the absolute position of a device, for example, an electrical motor for driving a tool machine or a robot.

Having described the invention, what is claimed is:

1. A multipolar magnetic ring for generating a sinusoidal magnetic field, the magnetic ring comprising:

a cylindrical configuration with a height (h) and a width (l) between an internal diameter ($D_i$) and an external diameter ($D_e$), with a reading diameter ($D_l$) representing the positioning of one or more magnetic sensors for reading the magnetic field generated by the magnetic ring;

two magnetic poles north (N) and south (S) being imbricated one in the other such that their widths ($L_p$) are equal and constant, and two magnetic transitions between each of the two poles each follow a continuous curve that moves by one-half width of the respective pole for each quarter turn of the magnetic ring;

the two curves being shifted by 180° so that the magnetic ring has a single period corresponding to one turn of the magnetic ring.

2. A multipolar magnetic ring according to claim 1, wherein the reading diameter ($d_l$) is located in the center of the width l.

3. A multipolar magnetic ring according to claim 1, wherein the magnetic field is obtained on its cylindrical surface with the height (h), along two helixes ($h_1$ and $h_2$), which are imbricated and parallel and have a constant width ($L'_p$), starting at two diametrically opposite points ($P'_1$ and $P'_2$) of the reading diameter ($D'_l$), and which evolve in a continuous manner by one-half pole width ($L'_p$) for each quarter turn of rotation of the magnetic ring, the helixes being of equal length obtained after one rotation of one turn about the axis of symmetry (δ') of the magnetic ring.

4. A multipolar magnetic ring according to claim 3, wherein the two poles, north (N') and south (S'), are imbricated in such a manner that, at the location of the reading diameter ($D'_l$);

for a reference position 0° corresponding to an axis ($A'_0$), the magnetic field passes through the maximum of the south pole (S');

for a position 90°, which is orthogonal to the reference position 0°, corresponding to an axis ($A'_{90}$), the magnetic field passes through a helicoidal magnetic transition ($h_1$) between the north pole (N') and the south pole (S');

for a position 180°, which is orthogonal to the position 90°, corresponding to an axis ($A'_{180}$), the magnetic field passes though the maximum of the north pole (N'); and for a position 270°, which is orthogonal to the position 180°, corresponding to an axis ($A'_{270}$), the magnetic field passes through a second helical magnetic transition ($h_2$) between the south pole (S') and the north pole (N').

5. A multipolar magnetic ring according to claim 1, wherein the magnetic field is achieved on one of two flat parallel faces with width (l), along two imbricated spirals ($s_1$ and $s_2$) that start at two points ($P_1$ and $P_2$) diametrically opposite on the circumference (C) of the magnetic ring and have an equal length obtained after a rotation of at least a turn about the axis of symmetry (δ) of the magnetic ring.

6. A multipolar magnetic ring according to claim 5, characterized in that the two magnetic transitions defining the width of the two poles north (N) and south (S) are implemented in the form of two concentric spirals ($s_1$ and $s_2$), whose radius each ($R_1$ and $R_2$) varies according to the following equations, as a function of the mechanical angle ($\alpha$), expressed in polar coordinates:

$$R_2 = R_0 - (L_p * \alpha / \pi)$$

$$R_1 = R_2 - L_p$$

$$R_0 = (D_l/2) + (L_p/2)$$

with $R_0 = R_2$ if $\alpha = 0°$ and $\alpha$ being between 0 and $2\pi$ radians.

7. A multipolar magnetic ring according to claim 5, wherein the two magnetic poles north (N) and south (S) are imbricated in such a manner that:

for a reference position 0° corresponding to an axis ($A_0$), the south pole (S) is centered around the reading diameter ($D_l$) and symmetrically framed by two identical parts of the north pole (N);

for a position 90°, which is orthogonal to the reference position, corresponding to an axis ($A_{90}$), the magnetic transition ($s_2$) between the south pole (S) and the north pole (N) coincides with a reading diameter ($D_l$), and each pole has a width equal to ($L_p$);

for a position 180°, which is orthogonal to the position 90°, corresponding to an axis ($A_{180}$), the north pole (N) is centered about the reading diameter ($D_l$) and symmetrically framed by two identical parts of the south pole (S); and for a position 270°, which is orthogonal to the position 180°, corresponding to an axis ($A_{270}$), the magnetic transition ($s_2$) between the south and north poles coincides with the reading diameter ($D_l$), and each pole has a width equal to $L_p$.

* * * * *